United States Patent
Ohashi

(10) Patent No.: US 10,220,774 B2
(45) Date of Patent: Mar. 5, 2019

(54) VEHICLE INTERIOR LIGHTING APPARATUS

(71) Applicant: Yazaki Corporation, Tokyo (JP)

(72) Inventor: Tomonori Ohashi, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 48 days.

(21) Appl. No.: 15/422,717

(22) Filed: Feb. 2, 2017

(65) Prior Publication Data
US 2017/0225613 A1    Aug. 10, 2017

(30) Foreign Application Priority Data

Feb. 5, 2016   (JP) ................ 2016-021048

(51) Int. Cl.
| | | |
|---|---|---|
| *B60Q 3/80* | (2017.01) | |
| *F21K 9/61* | (2016.01) | |
| *F21V 8/00* | (2006.01) | |
| *B60Q 3/217* | (2017.01) | |
| *H05B 33/08* | (2006.01) | |
| *F21Y 113/13* | (2016.01) | |

(Continued)

(52) U.S. Cl.
CPC ............ *B60Q 3/217* (2017.02); *B60Q 3/80* (2017.02); *F21K 9/61* (2016.08); *G02B 6/001* (2013.01); *G02B 6/0006* (2013.01); *H05B 33/086* (2013.01); *H05B 33/0845* (2013.01); *H05B 33/0857* (2013.01); *F21Y 2113/13* (2016.08); *F21Y 2115/10* (2016.08)

(58) Field of Classification Search
CPC .. B60Q 3/217; B60Q 3/80; F21K 9/61; F21Y 2115/10; F21Y 2113/13; G02B 6/0006; G02B 6/001; H05B 33/0845; H05B 33/0857; H05B 33/086
See application file for complete search history.

(56) References Cited

U.S. PATENT DOCUMENTS

| | | | | |
|---|---|---|---|---|
| 6,402,354 B1 * | 6/2002 | Tatewaki | ................ | B60Q 3/74 362/234 |
| 6,974,238 B2 * | 12/2005 | Sturt | ...................... | B60R 13/02 257/89 |

(Continued)

FOREIGN PATENT DOCUMENTS

| | | |
|---|---|---|
| CN | 101240880 A | 8/2008 |
| CN | 201659928 U | 12/2010 |

(Continued)

OTHER PUBLICATIONS

Communication dated Nov. 13, 2018, issued by the State Intellectual Property Office of the People's Republic of China in counterpart Chinese Patent Application No. 201710066241.X.

*Primary Examiner* — Peggy A Neils
(74) *Attorney, Agent, or Firm* — Sughrue Mion, PLLC

(57) ABSTRACT

A vehicle interior lighting apparatus for illuminating the interior of a vehicle, being equipped with a plurality of light source units each having a light source emitting the three primary colors of light and a control connector for simultaneously controlling the on/off operations and the luminance levels of predetermined two colors in all the light source units and for individually controlling the on/off operation and the luminance level of one color other than the predetermined two colors in each of the light source units.

5 Claims, 14 Drawing Sheets

(51) Int. Cl.
*F21Y 115/10* (2016.01)
*B60Q 3/02* (2006.01)

(56) References Cited

U.S. PATENT DOCUMENTS

| | | | |
|---|---|---|---|
| 7,287,886 B2 * | 10/2007 | Iwai | B60Q 1/26 |
| | | | 362/488 |
| 7,534,017 B2 * | 5/2009 | Barowski | B60Q 1/302 |
| | | | 362/488 |
| 8,162,519 B2 * | 4/2012 | Salter | B60Q 3/54 |
| | | | 362/488 |
| 9,169,984 B2 * | 10/2015 | Takada | F21S 48/1291 |
| 2005/0281041 A1 * | 12/2005 | Kaphengst | B60Q 3/74 |
| | | | 362/492 |
| 2008/0191626 A1 | 8/2008 | Salter et al. | |
| 2010/0212819 A1 | 8/2010 | Salter et al. | |
| 2010/0214795 A1 | 8/2010 | Salter et al. | |
| 2010/0214798 A1 | 8/2010 | Salter et al. | |
| 2011/0121730 A1 | 5/2011 | Ito et al. | |
| 2012/0262937 A1 | 10/2012 | Hayashi et al. | |

FOREIGN PATENT DOCUMENTS

| | | |
|---|---|---|
| CN | 102729890 A | 10/2012 |
| JP | 2003-72463 A | 3/2003 |
| JP | 2011-110977 A | 6/2011 |
| JP | 2011-129250 A | 6/2011 |

\* cited by examiner

VEHICLE INTERIOR LIGHTING APPARATUS

CROSS REFERENCE TO RELATED APPLICATIONS

This application is based on and claims priority from Japanese patent application No. 2016-021048 filed on Feb. 5, 2016, the entire contents of which are incorporated herein by reference.

BACKGROUND OF THE INVENTION

1. Technical Field

The present invention relates to a vehicle interior lighting apparatus.

2. Background Art

Vehicles, such as automobiles, are provided with vehicle interior lighting apparatuses for illuminating the interiors of the vehicles. This kind of vehicle interior lighting apparatus is occasionally equipped with illumination emitting various colors of light on the console box, ceiling, door, etc. of the vehicle for the purpose of vehicle interior decoration (refer to Patent Documents JP-A-2011-110977 and JP-A-2011-129250).

SUMMARY

However, in vehicle interior illumination, light sources composed of multi-color LEDs or the like are caused to emit light with gradation so that colors are changed variously in some cases to enhance the decorative effect of the vehicle interior illumination. In such a case in which the light sources are caused to emit light with gradation, since the light sources emitting the various colors are controlled individually, the number of the components in the control circuit increases, and the control becomes complicated, whereby a problem of high cost occurs.

The present invention has been made in consideration of the above-mentioned circumstances, and an object of the present invention is to provide a vehicle interior lighting apparatus being capable of obtaining a high decorative effect while simplifying the light emission control of light sources as much as possible and while reducing cost by reducing the number of components and by simplifying control.

To attain the above-mentioned object, a vehicle interior lighting apparatus according to the present invention is characterized as described in the following items (1) to (5).

(1) A vehicle interior lighting apparatus for illuminating the interior of a vehicle, comprising:

a plurality of light source units each having a light source emitting the three primary colors of light, and a controller for simultaneously controlling the on/off operations and the luminance levels of predetermined two colors in all the light source units and for individually controlling the on/off operation and the luminance level of one color other than the predetermined two colors in each of the light source units.

(2) The vehicle interior lighting apparatus set forth in the above-mentioned item (1), wherein each of the light source units is equipped with a light guide member for guiding light coming from the light source, the light guide members are provided on the interior panel of a door of the vehicle such that parts thereof are exposed to the interior of the vehicle, and the light guide members are arranged at positions adjacent to one another.

(3) The vehicle interior lighting apparatus set forth in the above-mentioned item (1), wherein a door of the vehicle is equipped with a plurality of illumination sections for emitting illumination light, and the light source unit is disposed in each of the illumination sections.

(4) A vehicle interior lighting apparatus for illuminating the interior of a vehicle, being equipped with:

a light guide member having a plurality of light entering sections, a plurality of light sources emitting at least two colors of light toward the light entering sections of the light guide member, and a controller for controlling the light emission of the light sources, wherein in a state in which a light source is caused to emit a color, the controller controls the on/off operation of a light source emitting another color.

(5) The vehicle interior lighting apparatus set forth in the above-mentioned item (4), wherein the light guide member is formed into a rod shape in which the plurality of light entering sections are provided at intervals, and the light guide member is provided on the interior panel of the door of the vehicle such that parts thereof are exposed to the interior of the vehicle.

With the vehicle interior lighting apparatus configured as described in the above-mentioned item (1), in a state in which the predetermined two colors of the three primary colors capable of being emitted from the light sources of the plurality of light source units are emitted, the remaining one color is emitted at various luminance levels, whereby a high decorative effect can be obtained by illumination subjected to gradation while variations in the hues of the predetermined two colors are suppressed. Furthermore, since the predetermined two colors of the three primary colors in the plurality of light source units are controlled simultaneously and the remaining one color is controlled individually, the control can be simplified, the number of the components in the control circuit can be decreased, and the cost can be reduced.

With the vehicle interior lighting apparatus configured as described in the above-mentioned item (2), since the light guide members of the plurality of light source units provided adjacent to one another on the interior panel of the door emit light with gradation, whereby a high decorative effect can be obtained.

With the vehicle interior lighting apparatus configured as described in the above-mentioned item (3), since the light source unit provided in each of the illumination section on the interior panel of the door emits light with gradation, whereby a high decorative effect can be obtained.

With the vehicle interior lighting apparatus configured as described in the above-mentioned item (4), when the light sources emit a single color, the light guide member emits the single color. In this state, when the light source emitting another color is turned on by the controller, the respective colors coming from the light sources are mixed gradually in the light guide member toward the portions thereof between the light entering sections through which the light enters. As a result, a high decorative effect can be obtained by illumination subjected to gradation.

With the vehicle interior lighting apparatus configured as described in the above-mentioned item (5), since the rod-shaped light guide member provided on the interior panel of the door emits light so as to be subjected to gradation, whereby a high decorative effect can be obtained.

The present invention can provide a vehicle interior lighting apparatus being capable of obtaining a high decorative effect while simplifying the light emission control of light sources as much as possible and while reducing cost by reducing the number of components and by simplifying control.

The present invention has been described above briefly. Moreover, the details of the present invention will be further clarified by reading the descriptions of the modes (hereafter referred to as "embodiments") for embodying the invention to be described below referring to the accompanying drawings.

DETAILED DESCRIPTION OF EMBODIMENTS

Specific embodiments according to the present invention will be described below referring to the accompanying drawings.

(First Embodiment)

First, a first embodiment will be described.

Figure 1:
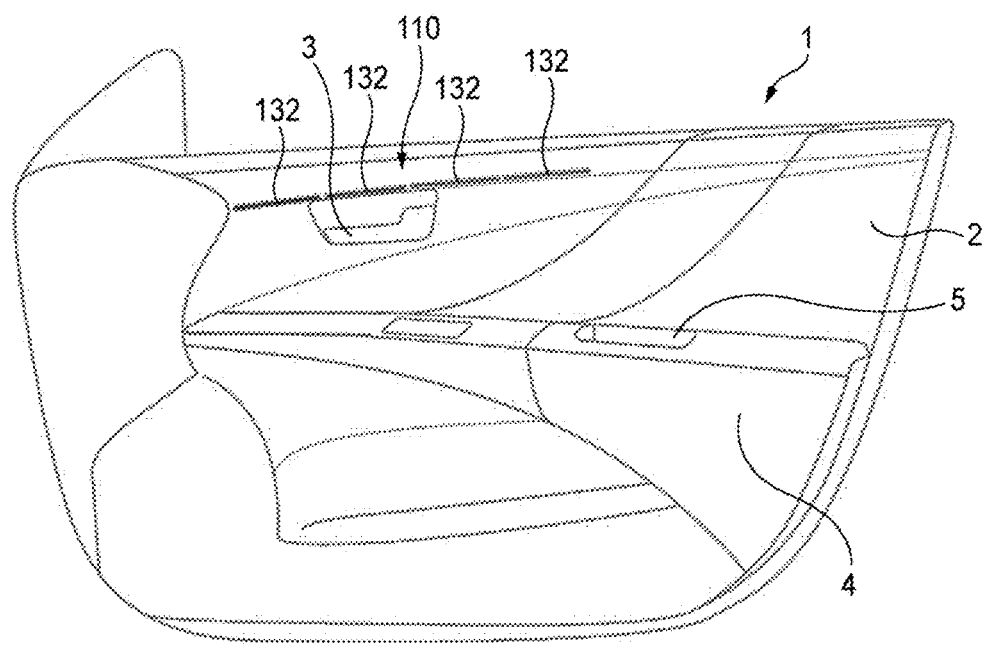
FIG. 1 is a schematic view showing a door, illustrating a vehicle interior lighting apparatus according to a first embodiment.
Figure 2:
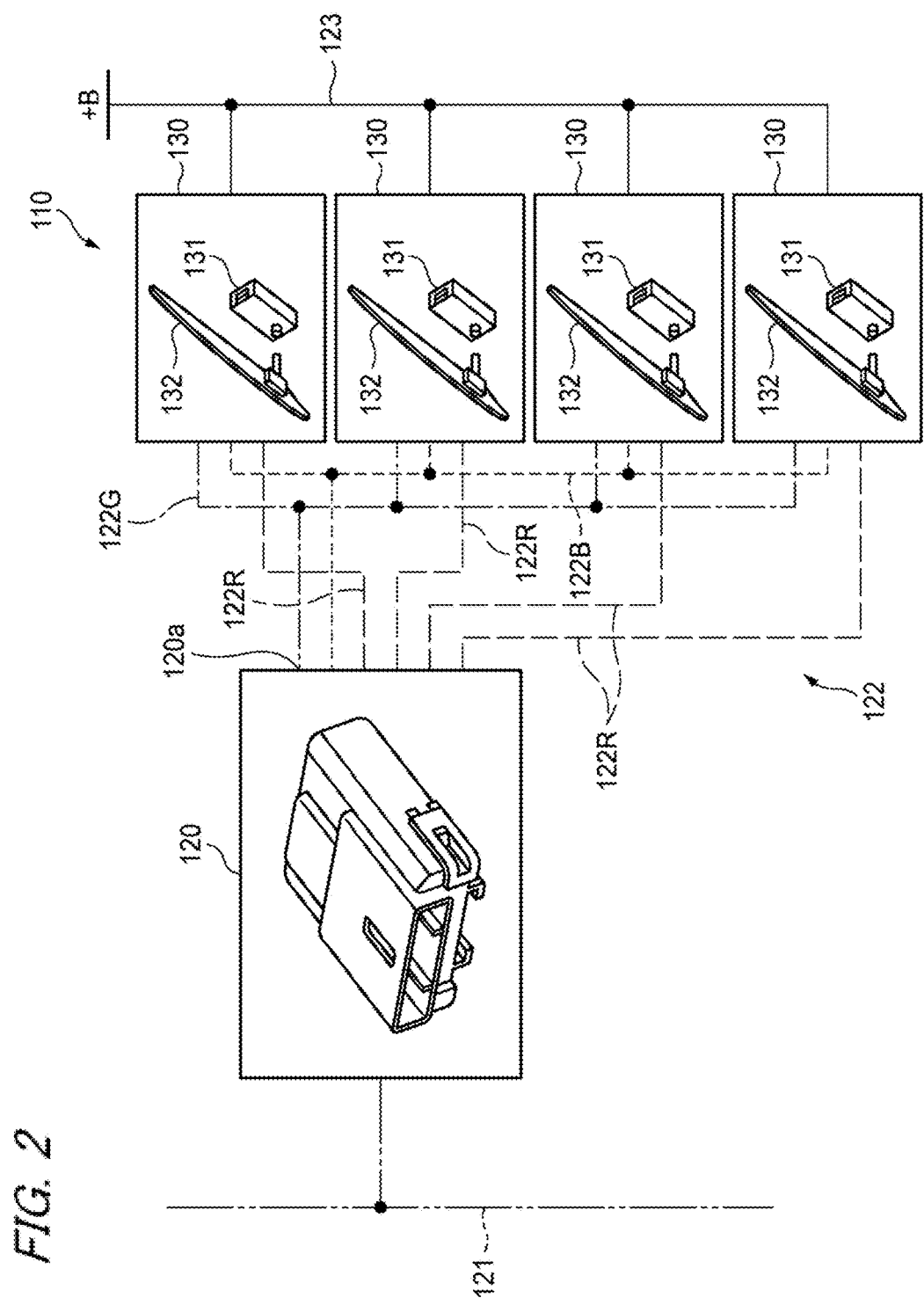
FIG. 2 is a schematic block diagram of the vehicle interior lighting apparatus according to the first embodiment.

FIG. 1 is a schematic view showing a door, illustrating a vehicle interior lighting apparatus according to the first embodiment. FIG. 2 is a schematic block diagram of the vehicle interior lighting apparatus according to the first embodiment.

As shown in FIG. 1, a vehicle interior lighting apparatus 110 according to the first embodiment is provided on the interior panel 2 of the door 1 of a vehicle. The door 1 has an opening/closing lever 3 and an armrest 4, and the armrest 4 is provided with a door pocket 5.

The vehicle interior lighting apparatus 110 is provided in the vicinity of the upper edge section of the interior panel 2 of the door 1 on the upper side of the opening/closing lever 3 and is disposed linearly in the front-rear direction (the left-right direction in FIG. 1) of the vehicle.

As shown in FIG. 2, the vehicle interior lighting apparatus 110 is equipped with a control connector 120 and a plurality of light source units 130. In this embodiment, the vehicle interior lighting apparatus 110 is equipped with four light source units 130.

The control connector 120 is a connector equipped with a controller. A communication line 121 from an ECU (not shown) is connected to this control connector 120. The control connector 120 is equipped with six output ports 120a.

Each light source unit 130 is equipped with a light source 131 and a light guide member 132. The light source 131 has a light emitting element, such as an LED (light emitting diode). The light source 131 is a multi-color LED emitting the three primary colors, red, green and blue. The light guide member 132 is made of a light-guiding resin and is formed into a rod shape. The light from the light source 131 enters the light guide member 132. The light guide members 132 are arranged in a row and fixed to the interior panel 2 of the door 1 such that parts thereof are exposed to the interior of the vehicle.

Control lines 122 are connected to the output ports 120a of the control connector 120. The control lines 122 extended from the control connector 120 are red control lines 122R, green control lines 122G and blue control lines 122B. The red control lines 122R are control lines individually connected to the respective light source units 130. The red control lines 122R, four in number, are connected to the output ports 120a of the control connector 120 and led to the respective light source units 130. The green control lines 122G and the blue control lines 122B are control lines connected collectively to the respective light source units 130. The green control line 122G and the blue control line 122B, one each in number on the side of the control connector 120, are branched into four lines in the middle. The green control line 122G and the blue control line 122B are connected to the output ports 120a of the control connector 120, and the four branched lines thereof are connected to the four light source units 130, respectively.

In the above-mentioned vehicle interior lighting apparatus 110, the on/off operation and the luminance level of the light source 131 of each light source unit 130 are controlled by the controller of the control connector 120. When the light sources 131 of the light source units 130 are turned on, the respective light guide members 132 of the light source units 130 provided on the interior panel 2 emit light, whereby linear illumination is obtained.

Next, the control of the light source units 130 using the control connector 120 will be described below.

Figure 3:
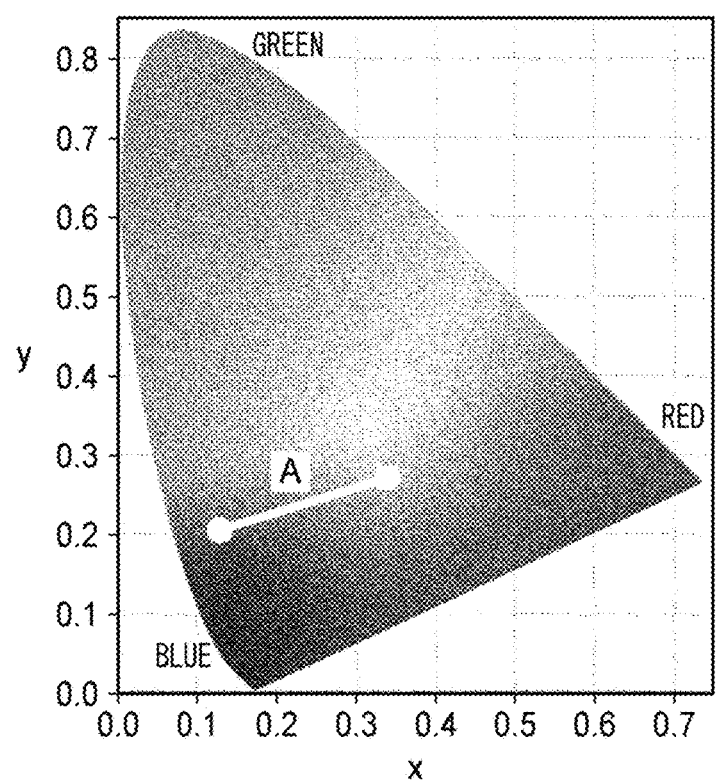
FIG. 3 is a graph representing hues, illustrating the control of a light source unit using a controller.

FIG. 3 is a graph representing hues, illustrating the control of the light source unit using the controller.

(Gradation Lighting Mode)

In the gradation lighting mode of the apparatus, the on/off operations and the luminance levels of predetermined two colors, green and blue, of each light source unit 130 are controlled together simultaneously by the controller of the control connector 120, and the on/off operation and the luminance level of the remaining color, red, other than the predetermined two colors are controlled individually. Hence, as shown in FIG. 3, for example, each light source unit 130 is lit in different mixed colors in which red is mixed with blue and green at the luminance levels in the intensity range A shown in the figure. As a result, in the vehicle interior lighting apparatus 110, the respective light guide members 132 emit light in various mixed colors in which red is mixed with the two colors, green and blue, at different luminance levels, whereby linear illumination subjected to gradation is obtained.

(Ordinary Lighting Mode)

In the ordinary lighting mode, all the light source units 130 are turned on in the same color (for example, red, green, blue or a mixed color of the respective colors) by the controller of the control connector 120. Hence, since the respective light guide members 132 emit light in the same color, linear illumination in the emitted color is obtained.

A vehicle interior lighting apparatus 110S according to a reference example will herein be described below.

Figure 4:
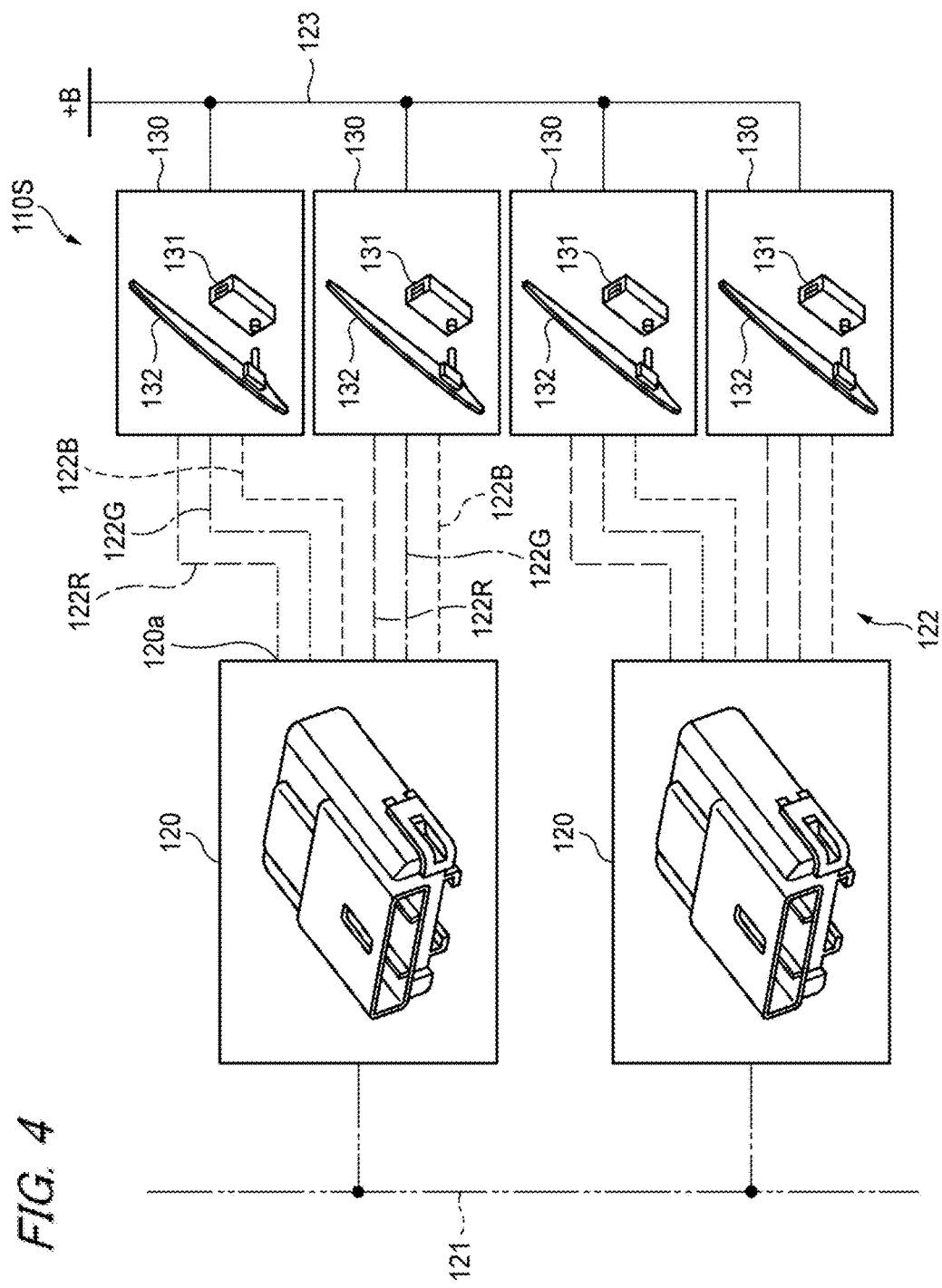
FIG. 4 is a schematic block diagram of a vehicle interior lighting apparatus according to a reference example.

FIG. 4 is a schematic block diagram of the vehicle interior lighting apparatus according to the reference example.

As shown in FIG. 4, the vehicle interior lighting apparatus 110S according to the reference example is equipped with two control connectors 120 each having six output ports 120a. Two red control lines 122R, two green control lines 122G and two blue control lines 122B connected to two light source units 130 are connected to each control connectors 120.

In the vehicle interior lighting apparatus 110S according to the reference example, the controller of the control connector 120 controls the light sources 131 of the respective light source units 130 so as to raise or lower the luminance levels of the three colors, red, green and blue, by individually controlling the three colors. As a result, the respective light guide members 132 emit light in various mixed colors in which the three colors, red, green and blue, are mixed, whereby illumination subjected to gradation is obtained.

However, in the vehicle interior lighting apparatus 110S according to the reference example, since the respective light source units 130 are individually controlled, the control becomes complicated and the number of components, such as the control connectors 120 and the control lines 122, increases to perform the complicated control. This results in an increase in cost. Furthermore, since the colors of emitted light are individually controlled, unintentional variations occur in the hues of the colors.

On the other hand, with the vehicle interior lighting apparatus 110 according to the first embodiment, in a state in which the predetermined two colors of the three primary colors capable of being emitted from the light sources 131 of the plurality of light source units 130 are emitted, the remaining one color is emitted at various luminance levels, whereby a high decorative effect can be obtained by illumination subjected to gradation while variations in the hues of the predetermined two colors are suppressed. Furthermore, since the predetermined two colors, green and blue, of the three primary colors in the plurality of light source units 130 are controlled simultaneously and the remaining one color, red, is controlled individually, the control can be simplified, the number of the components in the control circuit can be decreased, and the cost can be reduced.

In particular, since the rod-shaped light guide members 132 of the plurality of light source units 130 provided adjacent to one another on the interior panel 2 of the door 1 emit light with gradation, whereby a high decorative effect can be obtained.

In the above-mentioned first embodiment, the two colors, green and blue, are used as the predetermined two colors and controlled simultaneously and red is controlled individually in the light emission control of each light source unit 130 to perform gradation lighting. However, the color to be controlled individually is not limited to red.

Figure 5A:
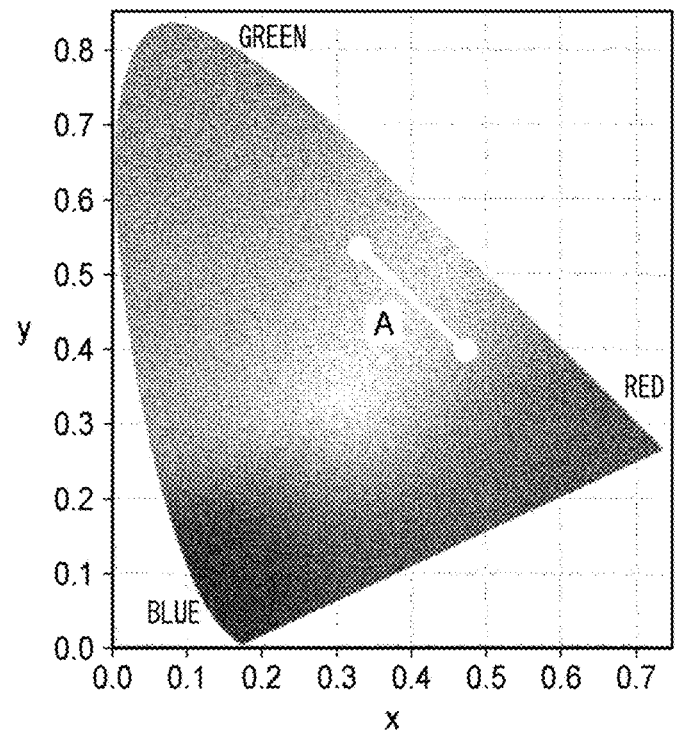
FIGS. 5A and 5B are graphs representing hues, illustrating other control examples of the light source unit using the controller.
Figure 5B:
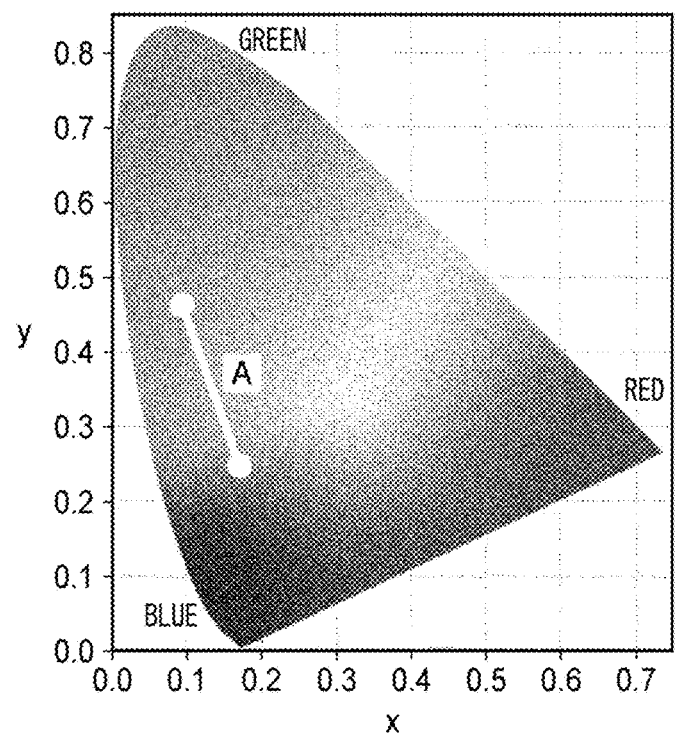

For example, it may be possible that two colors, red and green, are used as the predetermined two colors and controlled simultaneously and blue is controlled individually, whereby each light source unit 130 is lit in different mixed colors in which blue is mixed with red and green at the luminance levels in the intensity range A as shown in FIG. 5A. Furthermore, it may also be possible that two colors, red and blue, are used as the predetermined two colors and controlled simultaneously and green is controlled individually, whereby each light source unit 130 is lit in different mixed colors in which green is mixed with red and blue at the luminance levels in the intensity range A as shown in FIG. 5B.

Moreover, although the light guide members 132 of the light source units 130 are arranged in a row so as to be formed into a linear shape, the light guide members 132 are not limited to be arranged in a one-row linear shape.

Figure 6A:
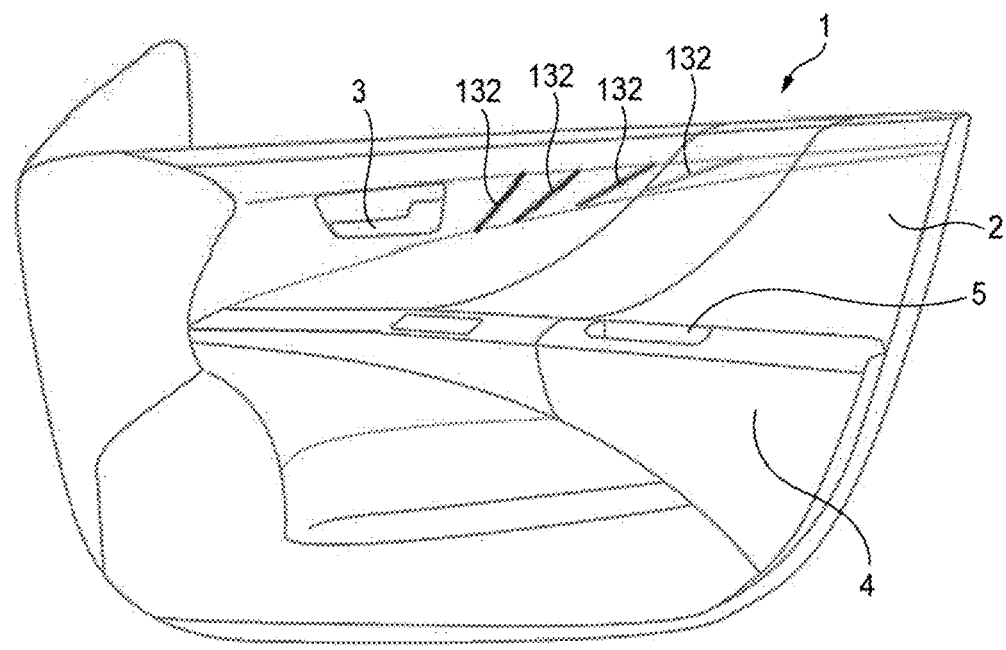
FIGS. 6A and 6B are schematic views showing doors, illustrating other arrangement examples of the light guide members of the light source units.
Figure 6B:
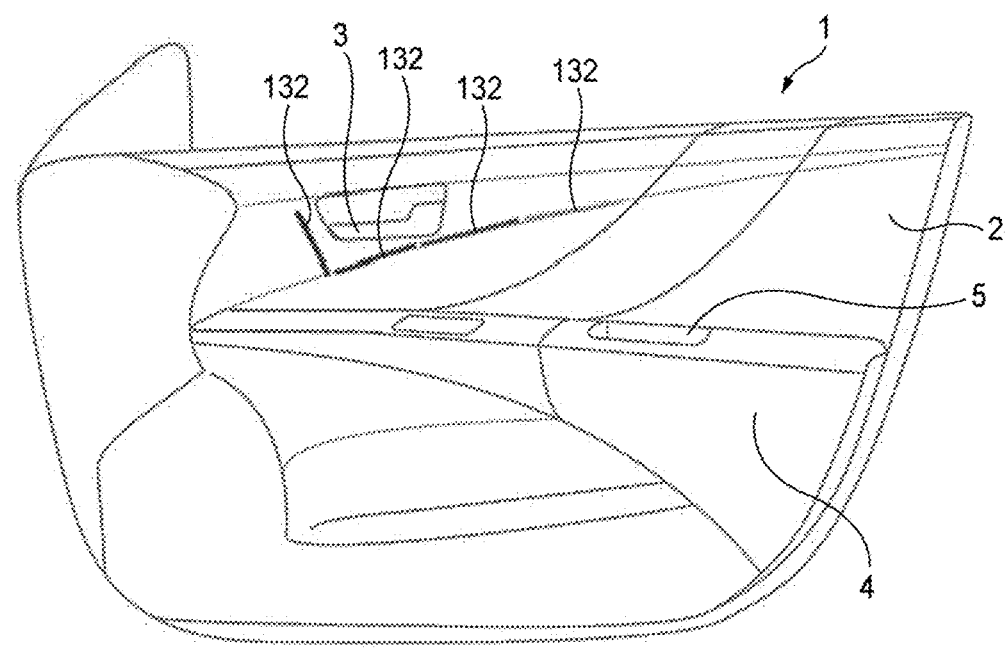

For example, as shown in FIG. 6A, the light guide members 132 may be arranged from the front side to the rear side of the vehicle so as to be gradually inclined toward the rear side of the vehicle, or as shown in FIG. 6B, one light guide member 132 may be arranged so as to cross a plurality of linearly arranged light guide members 132.

(Second Embodiment)

Next, a second embodiment will be described.

Figure 7:
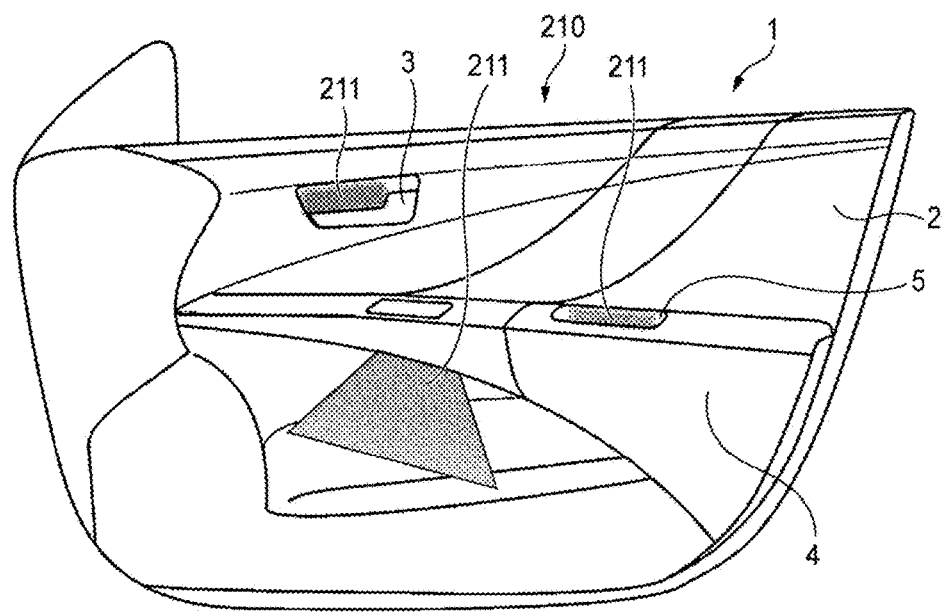
FIG. 7 is a schematic view showing a door, illustrating a vehicle interior lighting apparatus according to a second embodiment.
Figure 8:
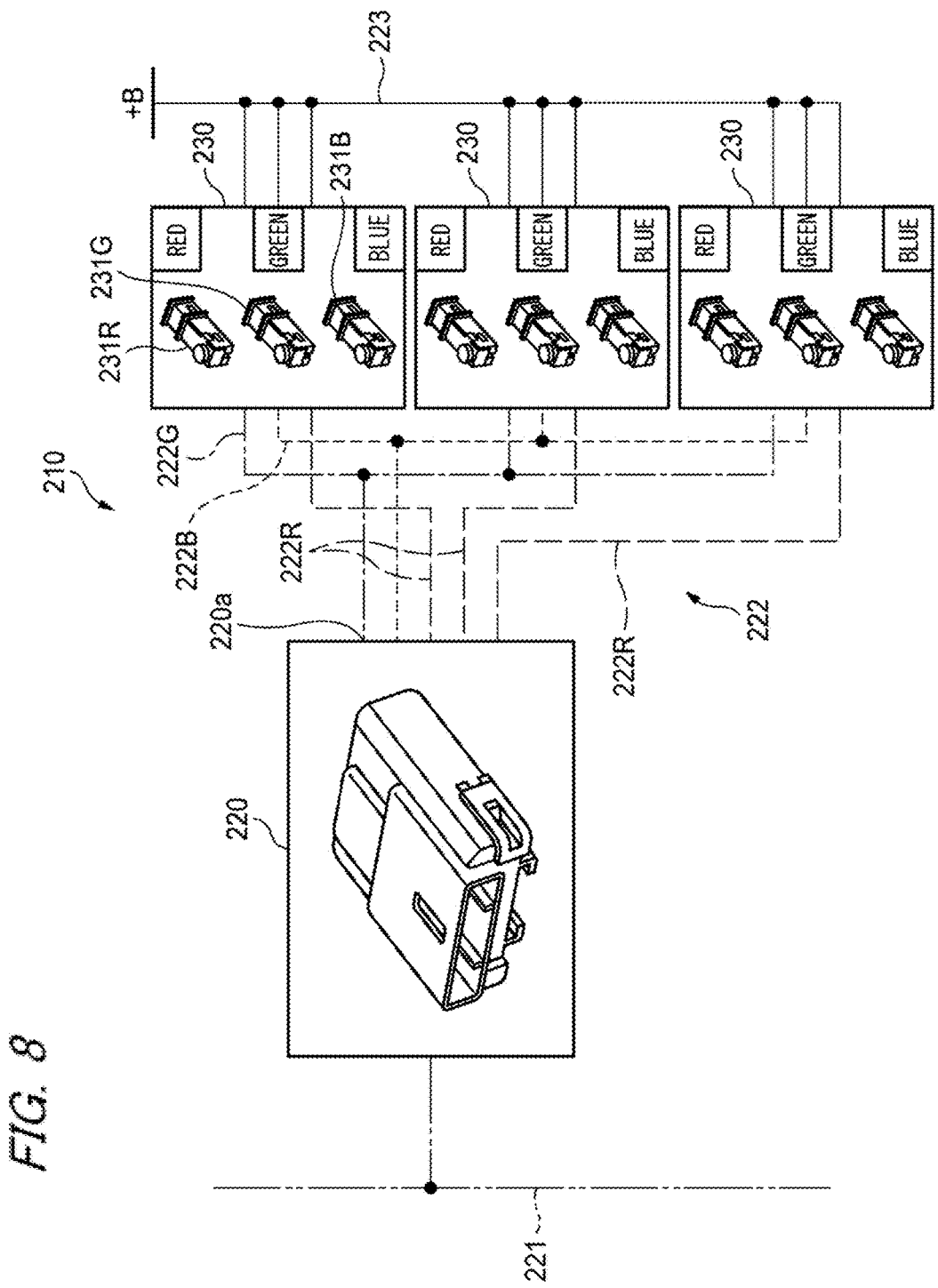
FIG. 8 is a schematic block diagram of the vehicle interior lighting apparatus according to the second embodiment.
Figure 9:
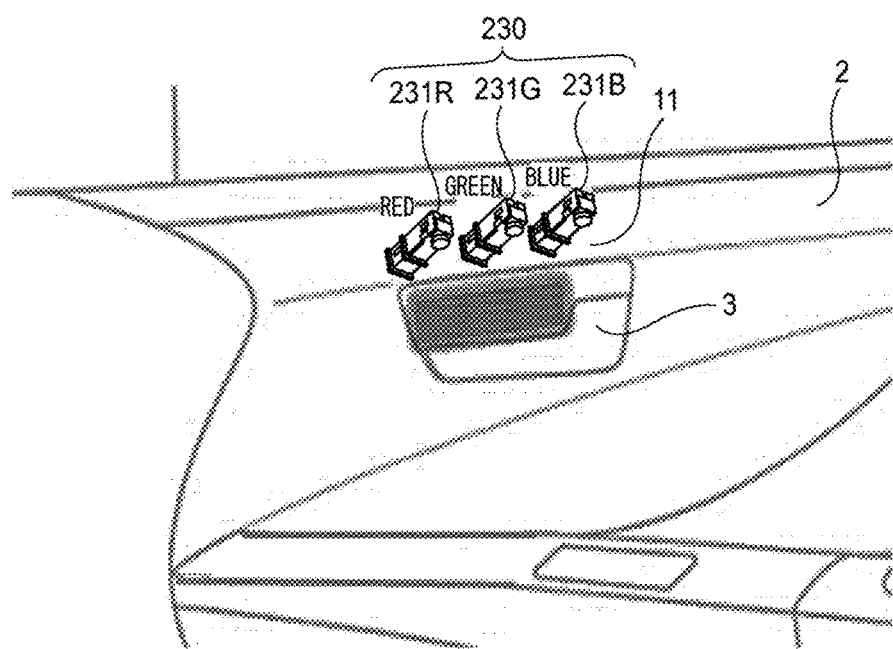
FIG. 9 is a schematic view showing part of the door, illustrating the arrangement of the light source units in the illumination sections of the lighting apparatus.

FIG. 7 is a schematic view showing a door, illustrating a vehicle interior lighting apparatus according to the second embodiment. FIG. 8 is a schematic block diagram of the vehicle interior lighting apparatus according to the second embodiment. FIG. 9 is a schematic view showing part of the door, illustrating the arrangement of the light source units in the illumination sections of the lighting apparatus.

As shown in FIG. 7, a vehicle interior lighting apparatus 210 according to the second embodiment has a plurality (three in this embodiment) of illumination sections 211. The respective illumination sections 211 are provided on the door 1 of the vehicle. More specifically, the illumination sections 211 are provided in the vicinity of the opening/closing lever 3 of the door 1, on the bottom section of the armrest 4 and in the door pocket 5 provided in the armrest 4 and are used to illuminate these portions and their peripheries.

As shown in FIG. 8, the vehicle interior lighting apparatus 210 is equipped with a control connector 220 and a plurality of light source units 230. In this embodiment, the vehicle interior lighting apparatus 210 is equipped with three light source units 230.

The control connector 220 is a connector equipped with a controller. A communication line 221 from an ECU (not shown) is connected to this control connector 220. The control connector 220 is equipped with five output ports 220a.

Each light source unit 230 is equipped with three light sources 231. The light source 231 has a light emitting element, such as an LED (light emitting diode). Each light source unit 230 has a red light source 231R for emitting red light, a green light source 231G for emitting green light and a blue light source 231B for emitting blue light. Hence, the light source unit 230 has the light sources 231 for the three primary colors, red, green and blue. As shown in FIG. 9, the light source unit 230 is provided in each illumination section 211 of the door 1.

Control lines 222 are connected to the output ports 220a of the control connector 220. The control lines 222 extended from the control connector 220 are red control lines 222R, green control lines 222G and blue control lines 222B. The red control lines 222R are control lines individually connected to the respective light source units 230. The red control lines 222R, three in number, are connected to the output ports 220a of the control connector 220 and led to the respective light source units 230. The green control lines 222G and the blue control lines 222B are control lines connected collectively to the respective light source units 230. The green control line 222G and the blue control line 222B, one each in number on the side of the control connector 220, are branched into three lines in the middle. The green control line 222G and the blue control line 222B are connected to the output ports 220a of the control connector 220, and the three branched lines thereof are connected to the three light source units 230, respectively.

Next, the control of the light source unit 230 using the control connector 220 will be described below.

(Gradation Lighting Mode)

In the gradation lighting mode, by the controller of the control connector 220, the light sources of predetermined two colors, the green light source 231G and the blue light source 231B of each light source unit 230, are controlled simultaneously and the red light source 231R thereof is controlled individually, whereby the luminance levels of the colors are raised or lowered. Hence, for example, each light source unit 230 is lit in different mixed colors in which red is mixed with green and blue at the luminance levels such that the luminance level of red is raised more than or lowered less than those of green and blue. As a result, in each illumination section 211, illumination subjected to gradation is obtained by the various mixed colors in which red is mixed with green and blue at different luminance levels.

(Ordinary Lighting Mode)

In the ordinary lighting mode, all the light source units 230 are lit in the same color (for example, red, green, blue or a mixed color of the respective colors) by the controller of the control connector 220. Hence, since the respective illumination sections 211 emit light in the same color, illumination in the emitted color is obtained.

As described above, with the vehicle interior lighting apparatus 210 according to the second embodiment, in a state in which, among the red light source 231R, the green light source 231G and the blue light source 231B capable of emitting the three primary colors in each light source unit 230, the green light source 231G and the blue light source 231B capable of emitting the predetermined two colors are lit, the red light source 231R capable of emitting the remaining one color, red, is lit at various luminance levels, whereby a high decorative effect can be obtained by illumination subjected to gradation. Furthermore, since the green light source 231G and the blue light source 231B capable of emitting the predetermined two colors of the three primary colors in each light source unit 230 are controlled simultaneously and the red light source 231R capable of emitting the remaining one color is controlled individually, the control can be simplified, the number of the components to be used for the control can be decreased, and the cost can be reduced.

Furthermore, since the light source unit 230 provided in each of the illumination sections 211 on the interior panel 2 of the door 1 emits light with gradation, whereby a high decorative effect can be obtained.

In the above-mentioned second embodiment, the light sources of the two colors, the green light source 231G and the blue light source 231B of each light source unit 230, are used as the light sources of the predetermined two colors and controlled simultaneously and the red light source 231R thereof is controlled individually to perform gradation lighting. However, the color to be controlled individually is not limited to red.

For example, it may be possible that the red light source 231R and the green light source 231G are used as the light sources of the predetermined two colors and controlled simultaneously and the blue light source 231B is controlled individually, whereby each light source unit 230 is lit in different mixed colors in which blue is mixed with red and green at the luminance levels in the intensity range A (see FIG. 5A). Furthermore, it may also be possible that the red light source 231R and the blue light source 231B are used as the light sources of the predetermined two colors and controlled simultaneously and the green light source 231G is controlled individually, whereby each light source unit 230 is lit in different mixed colors in which green is mixed with red and blue at the luminance levels in the intensity range A (see FIG. 5B).

Next, a vehicle interior lighting apparatus 210A according to a modification of the second embodiment will be described below.

Figure 10:
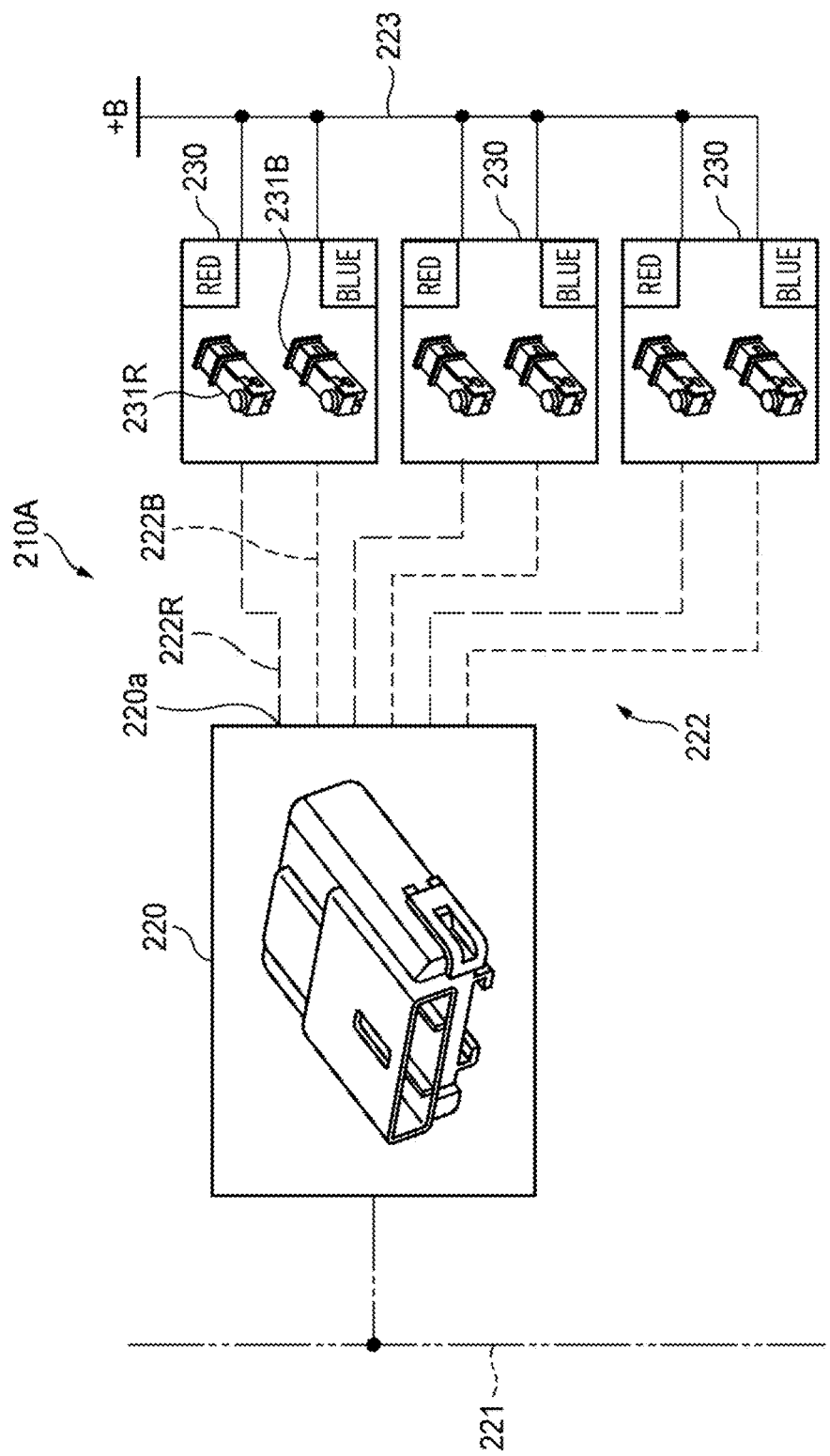
FIG. 10 is a schematic block diagram of a vehicle interior lighting apparatus according to a modification of the second embodiment.

FIG. 10 is a schematic block diagram of the vehicle interior lighting apparatus according to the modification of the second embodiment.

As shown in FIG. 10, in the vehicle interior lighting apparatus 210A according to the modification, each of the light source units 230 thereof is equipped with two light sources 231. Each light source unit 230 has a red light source 231R capable of emitting red light and a blue light source 231 B capable of emitting blue light.

The control lines 222 extended from the control connector 220 are red control lines 222R and blue control lines 222B. The red control lines 222R and the blue control lines 222B are control lines connected to the respective light source units 230. The red control lines 222R, three in number, and the blue control lines 222B, three in number, are connected to the output ports 220a of the control connector 220 and led to the respective light source units 230.

Next, the control of the light source unit 230 using the control connector 220 will be described below.

(Gradation Lighting Mode)

In the gradation lighting mode, by the controller of the control connector 220, the red light source 231R of each light source unit 230 is controlled individually, whereby the luminance level of the color is raised or lowered. Similarly, the blue light source 231B is controlled individually, whereby the luminance level of the color is raised or lowered. Hence, for example, each light source unit 230 is lit in different mixed colors in which red and blue are mixed at the raised or lowered luminance levels. As a result, in each illumination section 211, illumination subjected to gradation is obtained by the various mixed colors in which red and blue are mixed at different luminance levels.

(Ordinary Lighting Mode)

In the ordinary lighting mode, all the light source units 230 are lit in the same color (for example, red, blue or a mixed color of the respective colors) by the controller of the control connector 220. Hence, since the respective illumination sections 211 emit light in the same color, illumination in the emitted color is obtained.

(Third Embodiment)

Next, a third embodiment will be described.

Figure 11:
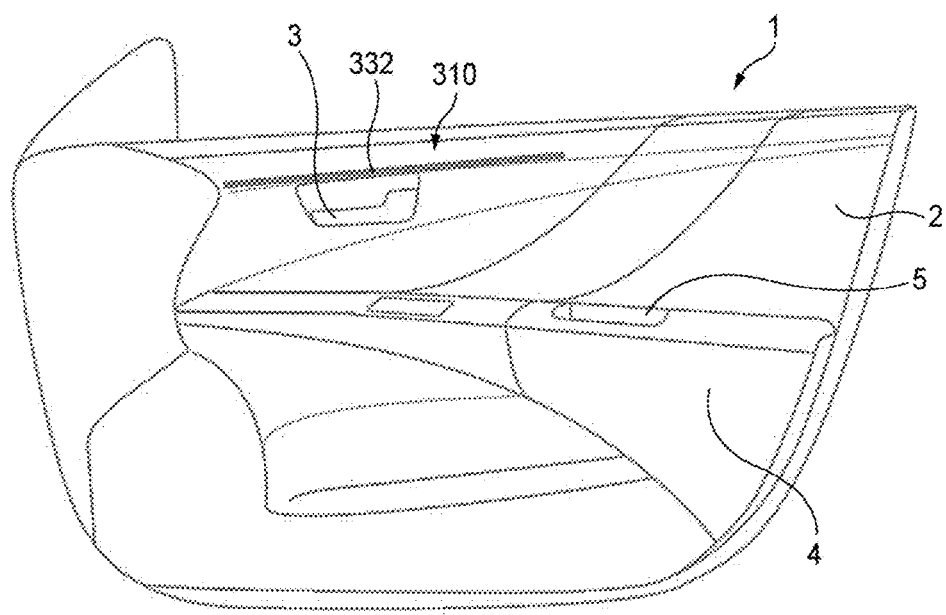
FIG. 11 is a schematic view showing a door, illustrating a vehicle interior lighting apparatus according to a third embodiment.
Figure 12:
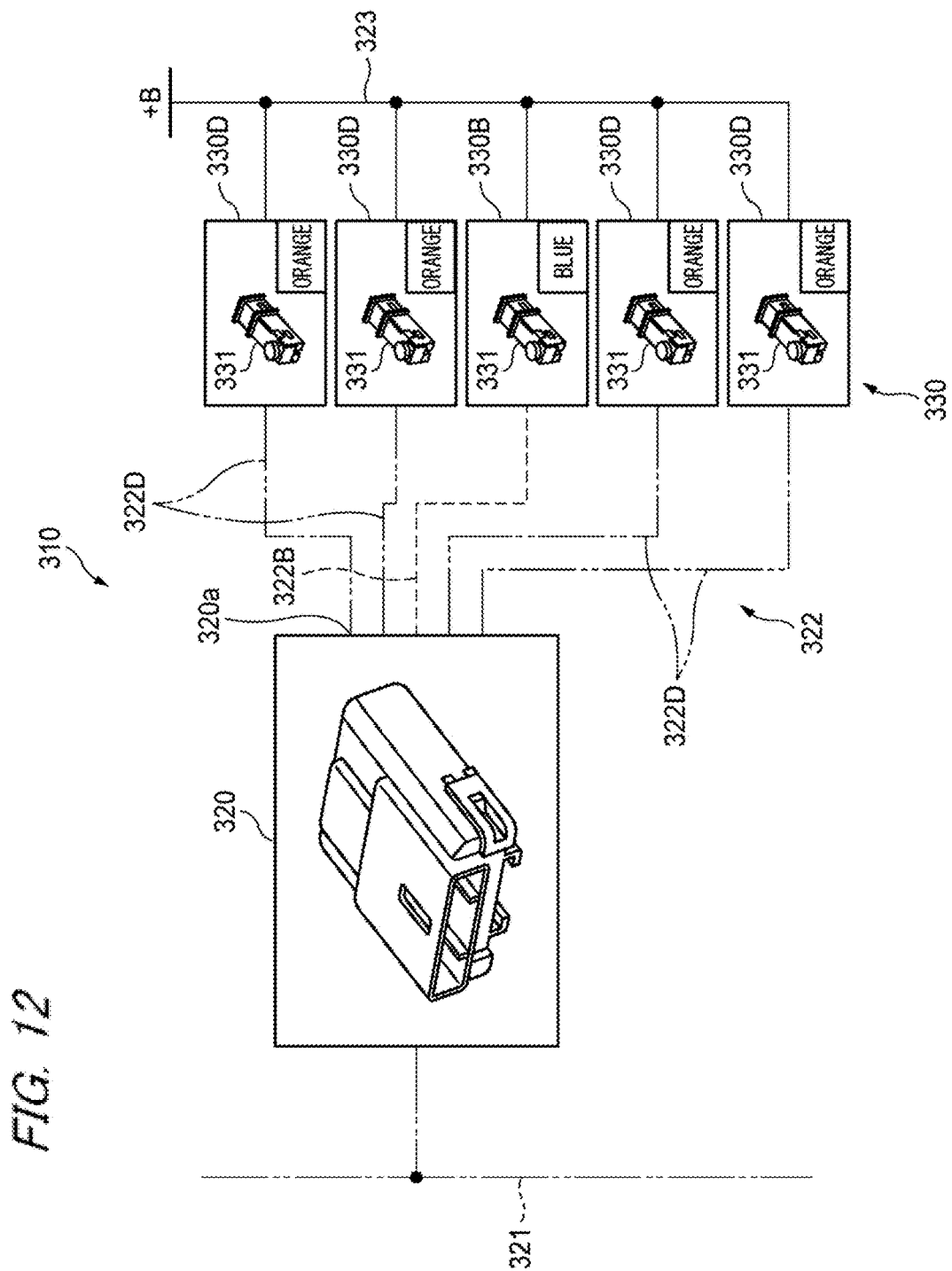
FIG. 12 is a schematic block diagram of the vehicle interior lighting apparatus according to the third embodiment.
Figure 13:
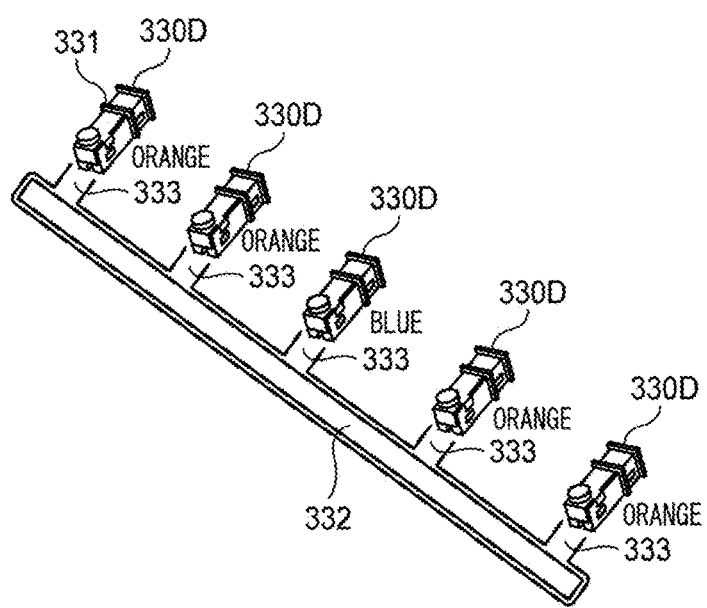
FIG. 13 is a perspective view showing a light guide member and light sources, illustrating the arrangement of the light sources with respect to the light guide member.

FIG. 11 is a schematic view showing a door, illustrating a vehicle interior lighting apparatus according to the third embodiment. FIG. 12 is a schematic block diagram of the vehicle interior lighting apparatus according to the third embodiment. FIG. 13 is a perspective view showing a light guide member and light sources, illustrating the arrangement of the light sources with respect to the light guide member.

As shown in FIG. 11, a vehicle interior lighting apparatus 310 according to the third embodiment is also provided on the door 1 of the vehicle. The vehicle interior lighting apparatus 310 is provided in the vicinity of the upper edge section of the interior panel 2 of the door 1 on the upper side of the opening/closing lever 3 and is disposed linearly in the front-rear direction (the left-right direction in FIG. 11) of the vehicle.

As shown in FIGS. 12 and 13, the vehicle interior lighting apparatus 310 is equipped with a control connector 320, a plurality of light source units 330 and a light guide member 332. In this embodiment, the vehicle interior lighting apparatus 310 is equipped with five light source units 330.

The control connector 320 is a connector equipped with a controller. A communication line 321 from an ECU (not shown) is connected to this control connector 320. The control connector 320 is equipped with a plurality of output ports 320a.

Each light source unit 330 has a light source 331. The light source 331 has a light emitting element, such as an LED (light emitting diode). One of the five light source units 330 is a blue light source unit 330B having a light source 331 emitting blue light, and the other four light source units are orange light source units 330D each having a light source 331 emitting orange light The light guide member 332 is made of a light-guiding resin and is formed into a long rod shape. The light guide member 332 is fixed to the interior panel 2 of the door 1 such that part thereof is exposed to the interior of the vehicle. The light guide member 332 has five light entering sections 333. The blue light source unit 330B is disposed at the center light entering section 333, and the orange light source units 330D are disposed at the other four light entering sections 333. Hence, light can enter the light guide member 332 from the blue light source unit 330B and the orange light source units 330D through the light entering sections 333 thereof.

The control lines 322 extended from the control connector 320 and the power line 323 extended from a battery (not shown) are connected to the light source units 330.

The control lines 322 are connected to the output ports 320a of the control connector 320. The control lines 322 extended from the control connector 320 are a blue control line 322B and orange control lines 322D. The blue control line 322B is a control line connected to the blue light source unit 330B. The blue control line 322B, one in number, is connected to the output port 320a of the control connector 320 and led to the blue light source unit 330B. The orange control lines 322D are control lines connected to the orange light source units 330D. The orange control lines 322D, four in number, are connected to the output ports 320a of the control connector 320 and are respectively led to the orange light source units 330D.

In the above-mentioned vehicle interior lighting apparatus 310, the on/off operation and the luminance level of the light source 331 of each light source unit 330 are controlled by the controller of the control connector 320. When the light sources 331 of the light source units 330 are turned on, the light guide member 332 provided on the interior panel 2 emits light, whereby linear illumination is obtained.

Next, the control of the light source units 330 using the control connector 320 will be described below.

Figure 14A:
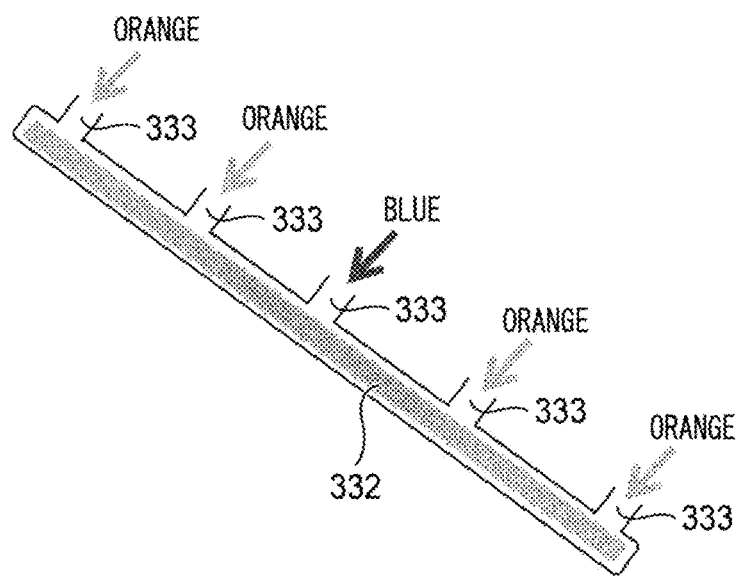
FIGS. 14A and 14B are perspective views showing the light guide member, illustrating the control of the light source units using the controller.
Figure 14B:
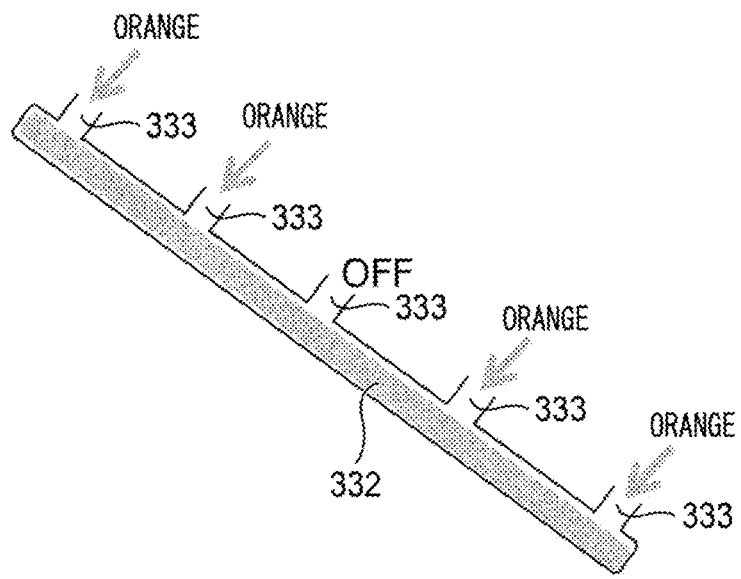

FIGS. 14A and 14B are perspective views showing the light guide member, illustrating the control of the light source units using the controller.

(Gradation Lighting Mode)

In the gradation lighting mode, the blue light source unit 330B and the orange light source units 330D are turned on by the controller of the control connector 320. Hence, as shown in FIG. 14A, the light guide member 332 emits light such that the central portion thereof emits light by virtue of the blue light from the blue light source unit 330B and such that the color of the light to be emitted is gradually changed to orange along the portions thereof away from the central portion toward both the ends thereof. As a result, linear illumination subjected to gradation is obtained.

(Ordinary Lighting Mode)

In the ordinary lighting mode, the orange light source units 330D are turned on and the blue light source unit 330B at the center is maintained in the off state by the controller of the control connector 320. Hence, as shown in FIG. 14B, the entire light guide member 332 emits a single color of light, orange light, coming from the orange light source units 330D. As a result, linear illumination in orange is obtained.

As described above, with the vehicle interior lighting apparatus 310 according to the above-mentioned third embodiment, when the light sources 331 of the orange light source units 330D emit a single color, orange, the light guide member 332 emits the single color. In this state, when the blue light source unit 330B emitting another color, blue, is turned on by the controller of the control connector 320, the respective colors coming from the light sources 331 of the orange light source units 330D and the blue light source unit 330B are mixed gradually in the light guide member 332 toward the portions thereof between the light entering sections 333 through which the light enters. As a result, a high decorative effect can be obtained by illumination subjected to gradation. Furthermore, various gradation lighting can be performed by changing the number and arrangement of the light entering sections 333 in the light guide member 332 and by changing the control for the light source units 330.

In particular, since the light guide member 332 provided on the interior panel 2 of the door 1 is formed into a rod shape in which the plurality of light entering sections 333 is provided at intervals, the rod-shaped light guide member 332 emits light with gradation, whereby a high decorative effect can be obtained.

In the above-mentioned third embodiment, the case in which the orange light and the blue light enter through the light entering sections 333 of the light guide member 332 is taken as an example. However, the colors of the light entering through the light entering sections 333 of the light guide member 332 are not limited to orange and blue, and the number of the colors of the light entering therethrough is not limited to two.

However, the present invention is not limited to the above-mentioned embodiments, but can be modified or improved as necessary. In addition, the materials, shapes, dimensions, quantities, arrangement positions, etc. of the respective components in the above-mentioned embodiments may be arbitrary and not limited, provided that the present invention can be achieved.

The characteristics of the embodiments of the vehicle interior lighting apparatus according to the present invention described above will be briefly summarized and listed in the following items [1] to [5].

[1] A vehicle interior lighting apparatus (110, 210) for illuminating the interior of a vehicle, comprising:
a plurality of light source units (130, 230) each having a light source (131, 231) emitting the three primary colors of light, and
a controller (control connector 120) for simultaneously controlling the on/off operations and the luminance levels of predetermined two colors in all the light source units (130, 230) and for individually controlling the on/off operation and the luminance level of one color other than the predetermined two colors in each of the light source units (130, 230).

[2] The vehicle interior lighting apparatus set forth in the above-mentioned item [1], wherein
each of the light source units (130) is equipped with a light guide member (132) for guiding the light coming from the light source (131), the light guide members (132) are provided on the interior panel (2) of a door (door 1) of the vehicle such that parts thereof are exposed to the interior of the vehicle, and the light guide members (132) are arranged at positions adjacent to one another.

[3] The vehicle interior lighting apparatus set forth in the above-mentioned item [1], wherein
a door (1) of the vehicle is equipped with a plurality of illumination sections (211) for emitting illumination light, and
the light source unit (230) is disposed in each of the illumination sections.

[4] A vehicle interior lighting apparatus (310) for illuminating the interior of a vehicle, comprising:
a light guide member (332) having a plurality of light entering sections (333),
a plurality of light sources (331) emitting at least two colors of light toward the light entering sections (333) of the light guide member (332), and
a controller (control connector 320) for controlling the light emission of the light sources (331), wherein
in a state in which a light source (331) is caused to emit a color, the controller (control connector 320) controls the on/off operation of a light source emitting another color.

[5] The vehicle interior lighting apparatus set forth in the above-mentioned item [4], wherein
the light guide member (332) is formed into a rod shape in which the plurality of light entering sections (333) are provided at intervals, and the light guide member (332) is provided on the interior panel (2) of the door (1) of the vehicle such that parts thereof are exposed to the interior of the vehicle.

What is claimed is:

1. A vehicle interior lighting apparatus for illuminating the interior of a vehicle, comprising:
a plurality of light source units each having a light source emitting three primary colors of light;
a controller for simultaneously controlling the on/off operations and the luminance levels of predetermined two colors in all the light source units and for individually controlling the on/off operation and the luminance level of one color other than the predetermined two colors in each of the light source units;
a first control line that connects the controller to all of the light source units and that permits the controller to simultaneously control the on/off operation and the luminance level of a first color of the predetermined two colors;
a second control line that connects the controller to all of the light source units and that permits the controller to simultaneously control the on/off operation and the luminance level of a second color of the predetermined two colors; and
a set of control lines that connects the controller to each of the light source units individually and that permits the controller to individually control the on/off operation and the luminance level of the one color other than the predetermined two colors, wherein
each control line, of the set of control lines, is connected to the controller and a respective individual light source unit of the plurality of light source units.

2. The vehicle interior lighting apparatus according to claim 1, wherein
each of the light source units is equipped with a light guide member for guiding light coming from the light source, the light guide members are provided on the interior panel of a door of the vehicle such that parts thereof are exposed to the interior of the vehicle, and the light guide members are arranged at positions adjacent to one another.

3. The vehicle interior lighting apparatus according to claim 1, wherein
a door of the vehicle is equipped with a plurality of illumination sections for emitting illumination light, and
the light source unit is disposed in each of the illumination sections.

4. A vehicle interior lighting apparatus for illuminating the interior of a vehicle, comprising:
a light guide member having a plurality of light entering sections,
a plurality of light sources emitting at least two colors of light through the light entering sections and to the light guide member, and
a controller for controlling the light emission of the light sources, wherein
in a state in which a light source is caused to emit a color, the controller controls the on/off operation of a light source emitting another color.

5. The vehicle interior lighting apparatus according to claim 4, wherein
the light guide member is formed into a rod shape in which the plurality of light entering sections are provided at intervals, and the light guide member is provided on the interior panel of the door of the vehicle such that parts thereof are exposed to the interior of the vehicle.

* * * * *